United States Patent
Price et al.

(10) Patent No.: US 9,261,406 B1
(45) Date of Patent: Feb. 16, 2016

(54) PYROMETER PROCESS TEMPERATURE MEASUREMENT FOR HIGH POWER LIGHT SOURCES

(75) Inventors: R. Kirk Price, Battle Ground, WA (US); Scott C. Cannon, Battle Ground, WA (US)

(73) Assignee: nLIGHT Photonics Corporation, Vancouver, WA (US)

( * ) Notice: Subject to any disclaimer, the term of this patent is extended or adjusted under 35 U.S.C. 154(b) by 132 days.

(21) Appl. No.: 13/595,935

(22) Filed: Aug. 27, 2012

(51) Int. Cl.
| | |
|---|---|
| *G01J 5/48* | (2006.01) |
| *G01J 5/00* | (2006.01) |
| *G01K 1/16* | (2006.01) |
| *G01K 11/32* | (2006.01) |
| *G01K 11/00* | (2006.01) |
| *G01K 11/12* | (2006.01) |

(52) U.S. Cl.
CPC ... *G01J 5/00* (2013.01); *G01K 1/16* (2013.01); *G01K 11/32* (2013.01); *G01J 5/48* (2013.01); *G01K 11/00* (2013.01); *G01K 11/125* (2013.01)

(58) Field of Classification Search
CPC ............... G01J 5/00; G01J 5/48; G01K 1/16; G01K 11/00
USPC ......................................................... 356/43
See application file for complete search history.

(56) References Cited

U.S. PATENT DOCUMENTS

| | | | | |
|---|---|---|---|---|
| 4,313,344 | A * | 2/1982 | Brogardh et al. | 374/126 |
| 4,818,102 | A * | 4/1989 | Glenn | 356/43 |
| 4,956,538 | A | 9/1990 | Moslehi | |
| 5,029,117 | A * | 7/1991 | Patton | 702/135 |
| 5,182,788 | A * | 1/1993 | Tanaka | 385/131 |
| 6,459,951 | B1 | 10/2002 | Griffith et al. | |
| 6,682,524 | B1 * | 1/2004 | Elbrecht et al. | 606/9 |
| 7,084,068 | B2 | 8/2006 | Suguro et al. | |
| 7,453,051 | B2 | 11/2008 | Timans | |
| 2005/0008310 | A1 * | 1/2005 | Ohta et al. | 385/123 |
| 2005/0152643 | A1 * | 7/2005 | Blauvelt et al. | 385/31 |
| 2009/0200279 | A1 * | 8/2009 | Li | B23K 26/0639 219/121.66 |

* cited by examiner

*Primary Examiner* — Gregory J Toatley
*Assistant Examiner* — Hina F Ayub
(74) *Attorney, Agent, or Firm* — Klarquist Sparkman, LLP

(57) ABSTRACT

A process measurement system for measuring a parameter of a work surface includes a light source configured to provide a material processing beam, an optical delivery system optically coupled to the light source and configured to homogenize and direct the material processing beam to the work surface, the optical delivery system including a process optic for optically coupling the material processing beam to the work surface in a predetermined way, the optical delivery system including a delivery waveguide having an output face optically coupled to the process optic, and an optical pyrometer in optical communication with the optical delivery system and configured to receive a pyrometer signal emitted from the work surface and coupled into said output face.

23 Claims, 4 Drawing Sheets

PYROMETER PROCESS TEMPERATURE MEASUREMENT FOR HIGH POWER LIGHT SOURCES

BACKGROUND OF THE INVENTION

1. Field of the Invention

Generally, the field of the present invention involves temperature measurement of high power light sources. More particularly, the present invention relates to temperature measurement with pyrometers for systems utilizing high power light sources.

2. Background

For many material processing applications, processing techniques utilizing high power light sources, such as laser light sources, are preferred over other conventional processing techniques, such as mechanical or chemical ones. High power light sources can achieve the tight precision and accuracy requirements for the fabrication of both small and large structures, while maintaining very high wall-plug efficiency. High power systems typically include those producing 30 W to multiple kW or even higher. During operation, the work surface is typically monitored for closed or open-loop control of material processing variables or more generally to verify successful operation of the optical processing system. Different techniques may be used to monitor work surface temperature, such as contact measurement through thermocouples disposed in proximity to the surface or indirectly through remote sensing.

In one conventional remote sensing example, in order to monitor and maintain the process parameters of the light source at the work surface, one or more optical pyrometers are typically positioned in relation to the work surface and light source and aligned with the spot of the light source at the work surface. The pyrometer receives light emitted via thermal radiation from the material at the work surface piece and achieves a modicum of accuracy by overlapping the spot of the light source at the work surface with an acceptance aperture of the pyrometer. The pyrometer then typically filters incoming light so that only a particular wavelength is received and measured in order to determine parameters of the work surface or various layers thereof, such as surface temperatures. The pyrometer can be disposed away from the work surface, including behind one or more transparent windows, for contactless temperature measurement. Thus, remote sensing is generally preferred for improved accuracy, simplification of processing, and for lack of interference with the optical material processing assembly.

While useful for detecting uniform temperature profiles, such as oven-heated material work surfaces, problems arise when remote sensing involves incident material processing light at higher powers or tighter tolerance requirements. Careful alignment is required between the spot of the pyrometer signal and the spot of the processing beam. Furthermore, because of short working distances between the light source process optic and the work surface, conventional pyrometer optics have difficulty in imaging to the same spot as the focused high power laser light sources. Accordingly, the spot gathered by the pyrometer at the work surface is often a different size from the spot of the light source, resulting in inaccuracy in the temperature measurement. Also, the light source process optic may be capable of providing a variable focus or other variable parameters, altering the size or shape of the beam. Conventional pyrometers must be adjusted or recalibrated accordingly. For some applications a non-circular processing spot is used, such as a line, rectangle, square, hexagon, etc. The overlap between such spots and the typical circular shape of the pyrometer optic and associated beam are generally poor, leading to additional inaccuracies. Thus, there remains a need for a pyrometer temperature measurement process for use in conjunction with high powered light sources, without any of the attendant drawbacks.

SUMMARY OF THE INVENTION

In order to satisfy the aforementioned need for an innovation directed to solving the attendant problems of the prior art, in accordance with one aspect of the present invention a process measurement system for measuring a parameter of a work surface is provided which includes a light source configured to provide a material processing beam, an optical delivery system optically coupled to the light source and configured to direct the material processing beam to the work surface, the optical delivery system including a process optic for optically coupling the material processing beam to the work surface in a predetermined way, the optical delivery system also including a delivery waveguide having an output face optically coupled to the process optic, and an optical pyrometer in optical communication with the optical delivery system and configured to receive a pyrometer signal emitted from the work surface and coupled into the output face.

According to another aspect of the invention a material processing system includes a light source configured to emit a material processing beam for processing material at a work surface, a pyrometer configured to receive a pyrometer measurement signal from the work surface, said pyrometer for measuring at least one parameter of the material at the work surface, a pyrometer pickoff configured to receive the material processing beam and the pyrometer measurement signal and to direct the pyrometer measurement signal to said pyrometer, a delivery waveguide having first and second opposite ends, said deliver waveguide optically coupled at a first end to said pyrometer pickoff and configured to counter-propagate the material processing beam and the pyrometer measurement signal, and a process optic optically coupled to said second end of said delivery waveguide and configured to receive the material processing beam from said second end of said delivery waveguide and direct the material processing beam to the work surface and configured to receive the pyrometer measurement signal from the work surface and to direct the pyrometer measurement signal to said second end of said deliver waveguide, wherein the spot of the pyrometer measurement signal at the work surface and received by the pyrometer is aligned with the spot of material processing beam at the work surface by the counter-propagation of the pyrometer measurement signal and material processing beam through said delivery waveguide.

In still another aspect of the invention a method is provided for accurately measuring a parameter of a work surface processed by a material processing beam of a high power light source, the method including providing an optical delivery waveguide in optical communication with the work surface, and propagating a pyrometer measurement signal through the optical delivery waveguide in the reverse direction of the material processing beam to an optical pyrometer wherein the spot of the pyrometer measurement signal at the work surface received by the optical pyrometer is substantially the same as the spot of the material processing beam at the work surface.

The foregoing and other objects, features, and advantages will become more apparent from the following detailed description, which proceeds with reference to the accompanying figures.

DETAILED DESCRIPTION OF THE INVENTION

Figure 1:
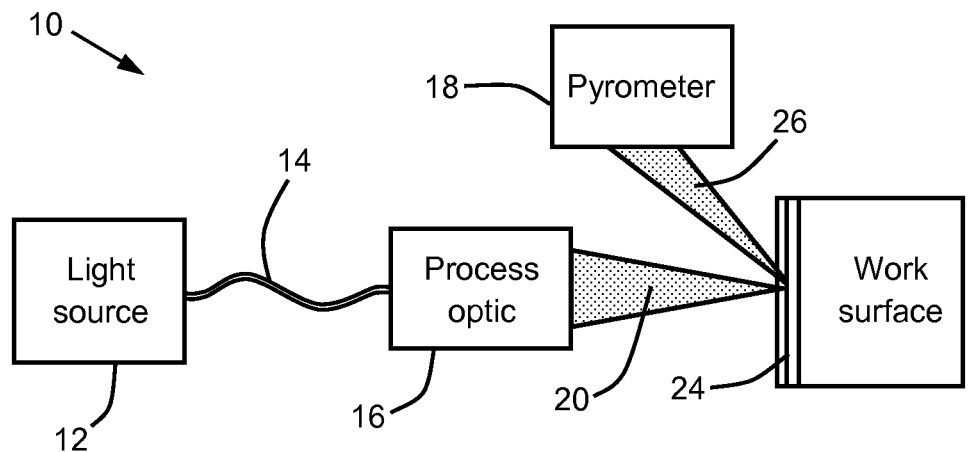
FIG. 1 is a block diagram of a prior art pyrometer process measuring system.
Figure 2:
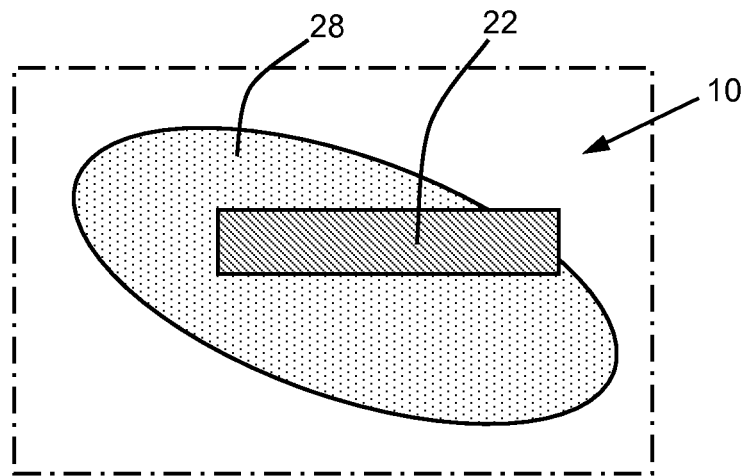
FIG. 2 is a spot diagram of a prior art pyrometer process measuring system.

Referring to FIGS. 1 and 2, a prior art pyrometer process measuring system 10 is shown. The processing system 10 includes a light source 12, delivery fiber 14, process optic 16, and pyrometer 18. The light source 12 generates a material processing beam 20 that is directed to and optically coupled into the delivery fiber 14. The delivery fiber 14 provides the processing energy to the process optic 16 which focuses the beam 20 to a processing spot 22 at a targeted work surface 24. The pyrometer 18 is positioned angularly in relation to the work surface 24 and configured to receive a pyrometer measurement signal 26 emitted from the work surface 24. An acceptance parameter of the pyrometer 18 is configured such that the pyrometer spot 28 that is accepted is aligned to lie in proximity to the processing spot 22 of the material processing beam 20 so as to form a measurement spot 28 that overlaps the processing spot 22. In FIG. 2, a typical overlapping mismatch between the processing beam spot 22 and measurement signal spot 28 is observed at the work surface 24. Measurement spot 28 is shown as an ellipse to account for the typical circular nature of the pyrometer measurement signal 26 and the typical angled positioning of the pyrometer 18 or beam output thereof relative to the delivered processing beam 20. Pyrometer 18 operates as a non-contact measurement device for detection of material parameters at the work surface 24 or of signal beam parameters reflected or emitted at the work surface 24, most commonly to determine the temperature thereof. Pyrometer 18 may be of any type that is suited for high power laser applications.

Figure 3:
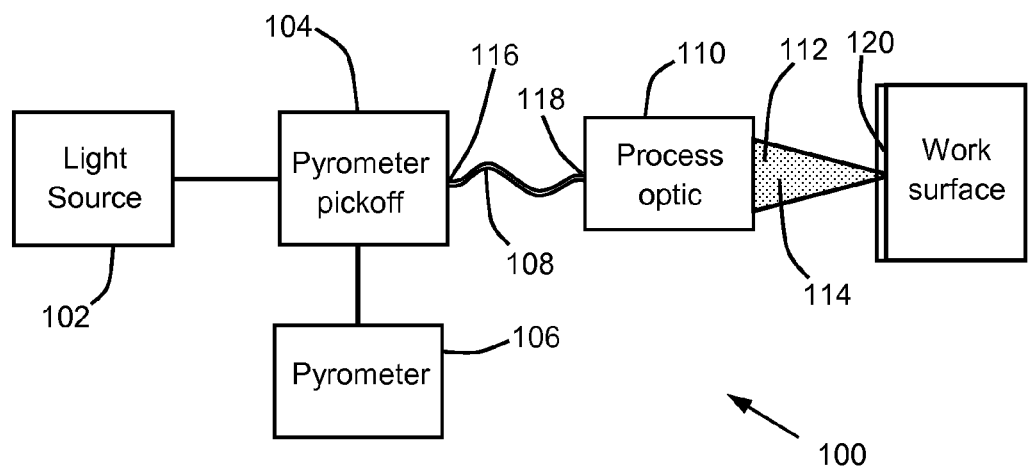
FIG. 3 is a block diagram of a pyrometer process measuring system according to an aspect of the present invention.

Referring now to FIG. 3, an exemplary embodiment is illustrated of a pyrometer process measuring system, generally designated 100, in accordance with an aspect of the present invention. Process measuring system 100 generally includes a light source 102, pyrometer pickoff 104, pyrometer 106, delivery fiber 108, and process optic 110. The light source 102 is capable of emitting a high power processing beam 112 (for convenience, only designated or identified between process optic 110 and work surface 120) which is optically coupled to the pyrometer pickoff 104 through one or more conventional techniques, such as through free space or fiber-based optical coupling. Moreover, other system components may be disposed between the light source 102 and pyrometer pickoff 104 to serve different system functions, such as amplification, projection, filtering, beam combination, beam homogenization, etc. Thus, the direct connection shown in FIG. 3 between the light source 102 and pyrometer pickoff 104, as with other direct connections illustrated herein, is only one of many possible examples of optical coupling therebetween which fall under the scope of the present invention.

The pyrometer 106 can receive a pyrometer measurement signal 114 (for convenience, only designated or identified between process optic 110 and work surface 120), or pyrometer beam, which is received through an optical coupling between the pyrometer 106 and pyrometer pickoff 104. The pyrometer 106 typically detects radiation in a predetermined wavelength range, usually narrow. The processing beam 112 propagates through the pickoff 104 and is coupled into an input face 116 of the delivery fiber 108. The delivery fiber 108 can serve to partially homogenize or substantially homogenize the material processing beam 112, providing the material processing beam at an output face 118 of the delivery fiber 108 with a substantially even transverse intensity profile across one or more transverse axes.

The material processing beam 112 emitted from the output face 118 is coupled to the process optic 110 and directed to a work surface 120. The work surface 120 is heated and radiation in a pyrometer wavelength range is emitted therefrom. Radiation in the pyrometer wavelength range that follows the reverse path of the material processing beam 112, counter-propagating through the process optic 110 and coupled into the output face 118 of the delivery fiber 108, forms the pyrometer measurement signal 114. Thus, the pyrometer measurement signal 114 propagates through the same delivery fiber 108 as the material processing beam 112, but along a reverse, counter-propagating path. Accordingly, an emission spot 122 of the measurement signal 114 at the work surface 120 which is coupled into the output face 118 of the deliver fiber 108 is aligned with a spot 124 of the material processing beam 112 at the work surface 120 without requiring a special positioning or calibration of the pyrometer 106. In some configurations the work surface may be one or more layers below the outermost layer of the workpiece.

Figure 4:
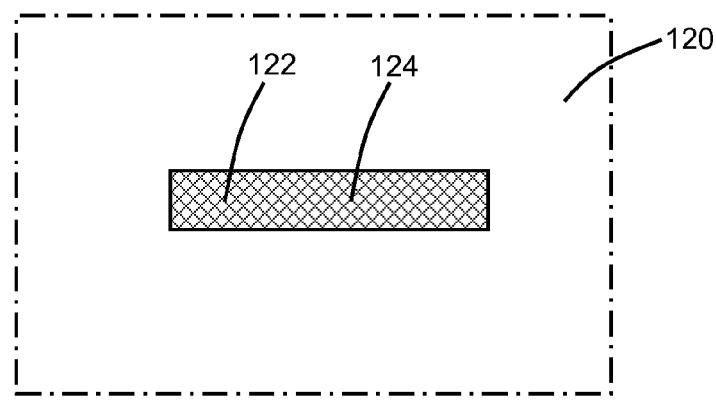
FIG. 4 is a spot diagram of a pyrometer process measuring system according to an aspect of the present invention.

With reference to FIGS. 3 and 4, because the beams 112, 114 propagate through the same optical delivery fiber 108, as described above the spots 122, 124 are seen to overlap each other with a minimum of misalignment or error at the work surface 120. Referring back to FIG. 3, the measurement signal 114 emitted from the work surface 120 propagates back through the process optic 110, into the output face 118 of the delivery fiber 108, into the pyrometer pickoff 104, and is out-coupled to the pyrometer 106 for measurement of work surface parameters, such as temperature. In some embodiments the process optic 110 may be operable to provide the material processing beam 112 with an altered shape, spot size, or working distance between the process optic 110 and the work surface 120 in a predetermined way.

Figure 5:
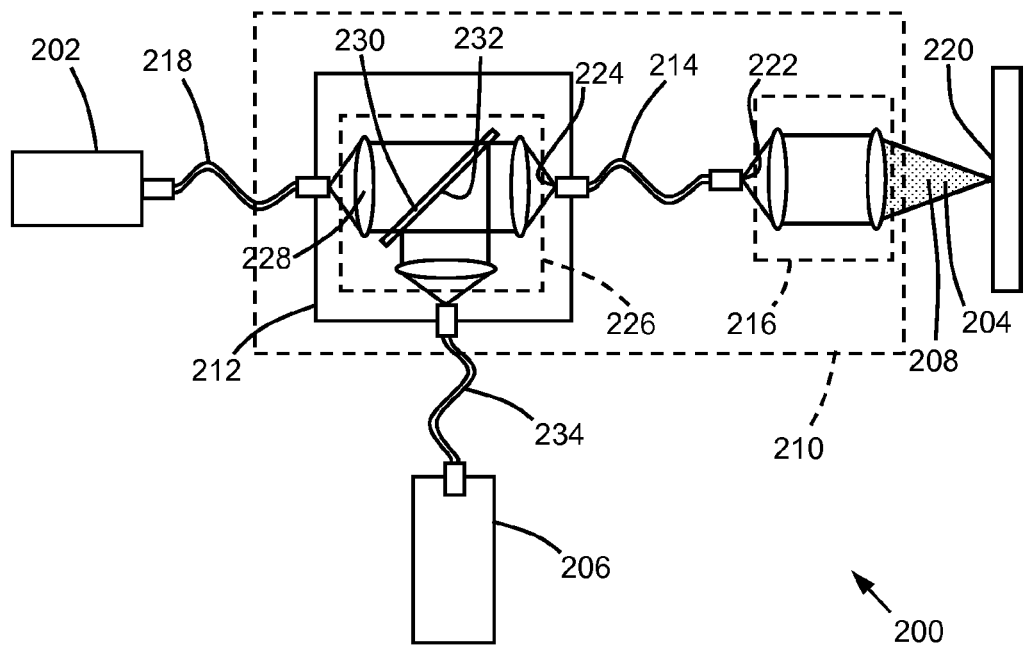
FIG. 5 is a detailed diagram of a pyrometer process measuring system according to an aspect to the present invention.

Referring to FIG. 5, a detailed diagram is shown of a second embodiment of a pyrometer process measurement system 200 in accordance with an aspect of the present invention. System 200 includes a fiber-coupled diode module laser light source 202 operable to emit a material processing beam 204 (for convenience, only designated or identified between process optic 216 and work surface 220), a fiber-coupled pyrometer 206 operable to receive a pyrometer signal 208, and an optical delivery system 210 which includes a pyrometer pickoff 212, delivery fiber 214, and process optic 216. Light source 202 is preferably a laser light source, such as one or more a fiber lasers, diode-pumped solid state lasers, fiber-coupled diode modules, or frequency converted light sources.

Laser powers are generally very high, such as in the range of 30 W to multiple kW, but typically vary according to the material to be processed, including semiconductor materials, metallic materials, glass and glass-like materials, etc., and the type of process used, including plastics welding, glass frit welding, thin metal welding, metal welding, thin film materials processing, annealing, marking, etc.

Material processing beam 204 is typically characterized by a wavelength or wavelength range, such as around 800 nm, 900-1100 nm, 1500-1600 nm, 2 µm, etc., and various frequency converted ranges thereof. Pyrometer measurement signals may be provided in any suitable detectable spectrum, including in the ranges of the aforementioned processing beam frequencies, though the detected measurement signal is typically spatially separated from the processing beam wavelength range so as to prevent optical cross talk. The material processing beam 204 from light source 202 is coupled into pyrometer pickoff 212 through a light source coupling fiber 218. Free space optics may be used in the place of the light source coupling fiber 218 in some applications, though fiber-coupled light provides positional flexibility in the optical system configuration, including separation of the process optic 212 from the light source 202. Similar benefits are achieved with fiber-coupled pyrometer 206 and the use of delivery fiber 214.

The pyrometer signal 208 is emitted from a work surface 220 and coupled through process optic 216. Process optic 216 directs the pyrometer signal 208 into an output face 222 of the delivery fiber 214 of the optical delivery system 210. The pyrometer signal 208 is emitted from an input face 224 of the delivery fiber 214 and into the pyrometer pickoff 212. The delivery fiber 214 can serve to partially homogenize or substantially homogenize the material processing beam 204, providing the material processing beam at the output face 222 with a substantially even transverse intensity profile across one or more transverse axes. Pyrometer pickoff 206 includes a free-space optics arrangement 226 which includes one or more optics 228 disposed in the pickoff 212 for receiving the pyrometer signal 208 and directing signal 208 to the fiber-coupled pyrometer 206 and for receiving the material processing beam 204 and directing the beam 204 to be coupled into the input face 224 of delivery fiber 214. Pyrometer pickoff 206 includes a dichroic mirror 230 positioned in the arrangement 226 such that material processing beam 204 coupled into the pickoff 206 propagates through the mirror 230 and pyrometer measurement signal 208 coupled into the pickoff 212 reflects at a high-reflectivity coated surface 232 of the mirror 230. Subsequent to reflection at the high-reflective surface 232 the pyrometer signal 208 is optically coupled into a pyrometer coupling fiber 234.

The work surface 220 is heated by the material processing beam 204 and radiation in a pyrometer wavelength range is emitted locally from the surface 220. Radiation in the pyrometer wavelength range that follows the reverse path of the material processing beam 204, counter-propagating through the process optic 216 and coupled into the output face 222 of the delivery fiber 214, forms the pyrometer measurement signal 208. Thus, the pyrometer measurement signal 208 propagates through the same output face 222 of the delivery fiber 214 as the material processing beam 204, but along a reverse path. Accordingly, as seen in FIGS. 6A-D, an emission spot 236 of the measurement signal 208 at the work surface 220 which is coupled into the output face 222 of the deliver fiber 214 is aligned with a spot 238 of the material processing beam 204 at the work surface 220 without requiring a special positioning or calibration of the pyrometer 206. Moreover, such self-calibration occurs even when process optic 216 is a variable process optic, such as a process optic capable of providing different spot size, spot shape, or working distance for the material processing beam 204 in a predetermined way.

Figure 6A:
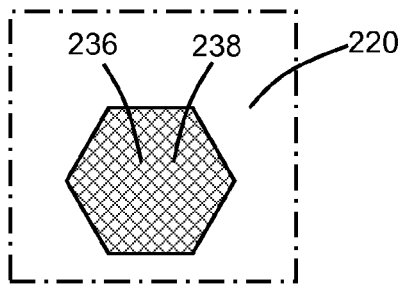
FIG. 6A is a hexagonal spot diagram of a pyrometer process measuring system according to an aspect to the present invention.
Figure 6B:
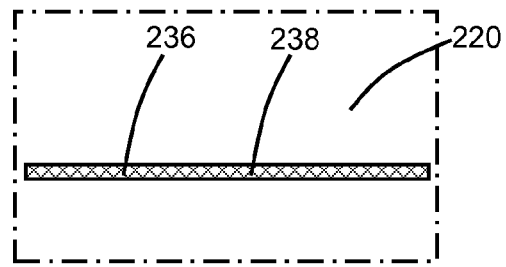
FIG. 6B is a line spot diagram of a pyrometer process measuring system according to an aspect to the present invention.
Figure 6C:
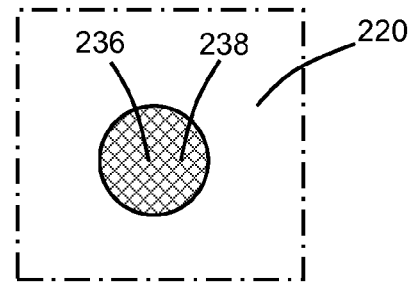
FIG. 6C is a circular spot diagram of a pyrometer process measuring system according to an aspect to the present invention.
Figure 6D:
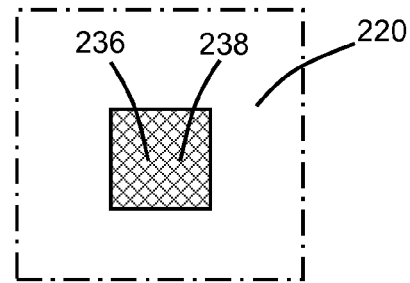
FIG. 6D is a square spot diagram of a pyrometer process measuring system according to an aspect to the present invention.

As was discussed hereinbefore, optical delivery fiber 214 may provide a homogenization function for the material processing beam 204 as well as a delivery function. For example, delivery fiber 214 may include cladding layers of different geometrical shapes, such as hexagon, line (or non-circular), circular, and square configurations as shown in FIGS. 6A-D, for homogenization of the signal propagating therein. In some examples, now in reference to FIGS. 6A-D, various material processing beam spots 238 may be achieved at the work surface 220 using the delivery fiber 214, or in combination with the process optic 216 or other components of the optical delivery system 210. The emission spot of the measurement signal 208 and the spot of the material processing beam 204 are again co-aligned. In FIG. 6A a material processing beam spot 238 is hexagonal at the work surface to be processed due to the hexagonal shape of the output face 222 of the delivery fiber 214. In FIG. 6B the spot of a narrow material processing line is shown in accordance with an output face 222. In FIG. 6C the spot of a conventional circular output is shown. In FIG. 6D a square spot is shown for a delivery fiber 214 having a rectangular output face 222.

Figure 7:
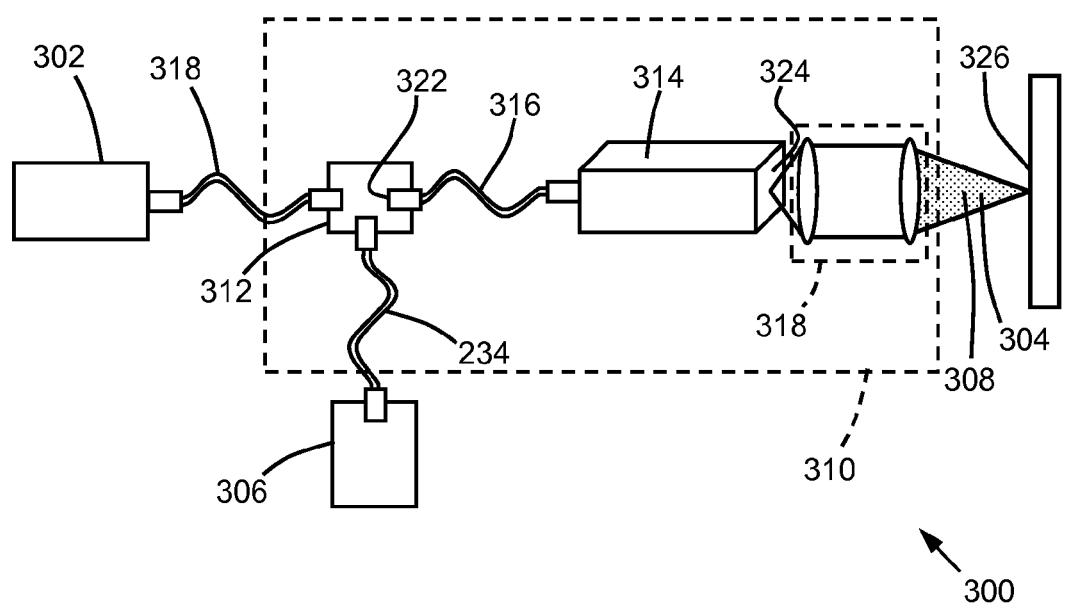
FIG. 7 is a detailed diagram of a pyrometer process measuring system according to an aspect of the present invention.

Referring to FIG. 7, another embodiment of a material processing system is shown in accordance with an aspect of the present invention. The system 300 includes a light source 302 capable of providing a material processing beam 304, a fiber-coupled pyrometer 306 capable of receiving a pyrometer measurement signal 308, and an optical delivery system 310 that includes a pyrometer pickoff 312, a delivery lightpipe 314, a coupling fiber 316, and a process optic 318. The material processing beam 304 is directed into a light source coupling fiber 320 and coupled into the pyrometer pickoff 312. The beam 304 transmits through and into coupling fiber 316 through an input face 322 thereof. Coupling fiber 316 is optically coupled to lightpipe 314. The material process beam 304 propagates through lightpipe 314 and becomes homogenized in a predetermined way across one or more axes transverse to the direction of propagation. The beam 304 is emitted from the output face 324 of the delivery lightpipe 314 and coupled into the process optic 318 before being directed to a surface 326 to be processed.

As the work surface 326 becomes heated by the material process beam 304 radiation in a pyrometer wavelength range is emitted therefrom. Radiation in the pyrometer wavelength range that follows a reverse path as the material processing beam 304 is coupled into the output face 324 of the lightpipe 314 to become pyrometer signal 308. Thus, the pyrometer measurement signal 308 propagates through the same output face 324 of the delivery lightpipe 314 as the material processing beam 304, but along a reverse path. Accordingly, an emission spot of the measurement signal 308 at the work surface 320 which is coupled into the output face 324 of the delivery lightpipe 314 is aligned with a spot of the material processing beam 304 at the work surface 320 without requiring a special positioning or calibration of the pyrometer 306. Moreover, such self-calibration occurs even when process optic 318 is a variable process optic, such as a process optic capable of providing different spot size, spot shape, or working distance for the material processing beam 304.

It is thought that the present invention and many of the attendant advantages thereof will be understood from the foregoing description and it will be apparent that various changes may be made in the parts thereof without departing from the spirit and scope of the invention or sacrificing all of

What is claimed is:

1. A process measurement system for measuring a parameter of a work surface, comprising:
   a laser light source situated to produce a non-pyrometric material processing beam having an output power of at least 30 W;
   a homogenizing optical delivery system optically coupled to the laser source and situated to direct the material processing beam to the work surface, said optical delivery system including a process optic situated to optically couple the material processing beam to the work surface in a predetermined way, said optical delivery system also including a delivery waveguide having an output face optically coupled to said process optic; and
   an optical pyrometer in optical communication with said optical delivery system and situated to receive a pyrometer signal emitted from the work surface and coupled to said output face.

2. The process measurement system of claim 1 wherein a spot of the pyrometer signal at the work surface and a spot of the material processing beam at the work surface are substantially coterminous.

3. The process measurement system of claim 1 wherein said process optic provides the material processing beam with a fixed spot size, spot shape, and working distance.

4. The process measurement system of claim 1 wherein said process optic provides the material processing beam with a variable spot size, spot shape, and working distance.

5. The process measurement system of claim 1 wherein said process optic is configured to produce a change in the shape of the material processing beam.

6. The process measurement system of claim 1 wherein said optical delivery system produces the material processing beam so as to have a circular cross-section.

7. The process measurement system of claim 1 wherein said optical delivery system produces the material processing beam so as to have a non-circular cross-section.

8. The process measurement system of claim 1 wherein said optical delivery system produces the material processing beam so as to have a hexagonal cross-section.

9. The process measurement system of claim 1 wherein said optical delivery system produces the material processing beam so as to have a rectangular cross-section.

10. The process measurement system of claim 1 wherein said optical delivery system includes an optical pickoff configured to receive the material processing beam and the pyrometer signal and to optically couple the pyrometer signal into said optical pyrometer.

11. The processing measurement system of claim 10 wherein said optical pickoff includes a dichroic mirror having a first surface coated with a high-reflective coating, said high-reflective coating configured to reflect at least a portion of the pyrometer signal.

12. The processing measurement system of claim 1 wherein said process optic includes one or more anti-reflective coatings selected to reduce reflectance in wavelength ranges associated with the pyrometer signal and the material processing beam.

13. The processing measurement system of claim 12 wherein the one or more anti-reflective coatings comprise a broad-band filter or a notch filter.

14. The process measurement system of claim 1 wherein said delivery waveguide is an optical fiber.

15. The process measurement system of claim 1 wherein said delivery waveguide is a lightpipe.

16. The process measurement system of claim 1 wherein said output face is situated to emit the material processing beam and to receive the pyrometer signal.

17. The process measurement system of claim 1 wherein the pyrometer signal is aligned with the material processing beam by propagation of the pyrometer signal and the material processing beam through said delivery waveguide.

18. The system of claim 1, wherein the material processing beam has a single wavelength.

19. The system of claim 1, wherein the material processing beam operates at one or more wavelengths that are separate from one or more wavelengths provided by the optical pyrometer.

20. The system of claim 1, wherein the optical pyrometer is a passive optical pyrometer that receives an optical signal from the work surface without generating or directing an optical pyrometer signal beam to the work surface.

21. A material processing system comprising:
   a high power laser source situated to emit a non-pyrometer material processing beam having an output power of at least 30 W so as to process material at a work surface;
   a pyrometer situated to receive a pyrometer measurement signal from the work surface and to measure at least one parameter of the material at the work surface;
   a pyrometer pickoff configured to receive the material processing beam and the pyrometer measurement signal and to direct the pyrometer measurement signal to said pyrometer;
   a homogenizing delivery waveguide having first and second opposite ends, said delivery waveguide optically coupled at a first end to said pyrometer pickoff and configured to counter-propagate the material processing beam and the pyrometer measurement signal; and
   a process optic optically coupled to said second end of said delivery waveguide and configured to receive the material processing beam from said second end of said delivery waveguide and direct the material processing beam to the work surface and configured to receive the pyrometer measurement signal from the work surface and to direct the pyrometer measurement signal to said second end of said delivery waveguide;
   wherein a spot of the pyrometer measurement signal at the work surface and received by the pyrometer is aligned with a spot of material processing beam at the work surface by the counter-propagation of the pyrometer measurement signal and the material processing beam through said delivery waveguide.

22. A method of measuring a parameter of a work surface, comprising:
   providing a homogenizing optical delivery waveguide in optical communication with the work surface;
   propagating a non-pyrometric material processing beam, having a power of at least 30 W and generated from a high power laser source, through the optical delivery waveguide to the work surface so as to process the work surface; and
   propagating a pyrometer measurement signal through the optical delivery waveguide in the reverse direction of the material processing beam to an optical pyrometer wherein a spot of the pyrometer measurement signal at the work surface received by the optical pyrometer is substantially the same as a spot of the material processing beam at the work surface.

23. The method of claim 22 wherein said optical delivery waveguide is an optical fiber.

* * * * *